(12) United States Patent
Tanemura et al.

(10) Patent No.: US 9,274,659 B2
(45) Date of Patent: Mar. 1, 2016

(54) TRANSCAPACITIVE INPUT OBJECT SENSING

(71) Applicant: Synaptics Incorporated, San Jose, CA (US)

(72) Inventors: Tetsuo Tanemura, Yokohama (JP); Hiroshi Shimura, Kawasaki (JP); Wenchang Chen, Milpitas, CA (US)

(73) Assignee: Synaptics Incorporated, San Jose, CA (US)

( * ) Notice: Subject to any disclaimer, the term of this patent is extended or adjusted under 35 U.S.C. 154(b) by 152 days.

(21) Appl. No.: 14/039,281

(22) Filed: Sep. 27, 2013

(65) Prior Publication Data

US 2015/0091838 A1 Apr. 2, 2015

(51) Int. Cl.
*G06F 3/044* (2006.01)

(52) U.S. Cl.
CPC ..................................... *G06F 3/044* (2013.01)

(58) Field of Classification Search
CPC ........................................................ G06F 3/044
USPC .......................................................... 345/173
See application file for complete search history.

(56) References Cited

U.S. PATENT DOCUMENTS

| | | | |
|---|---|---|---|
| 5,841,078 A | 11/1998 | Miller et al. | |
| 5,945,980 A | 8/1999 | Moissev et al. | |
| 7,864,160 B2 | 1/2011 | Geaghan et al. | |
| 7,911,456 B2 | 3/2011 | Gillespie et al. | |
| 7,920,129 B2 | 4/2011 | Hotelling et al. | |
| 7,986,313 B2 | 7/2011 | Krah | |
| 7,990,160 B2 | 8/2011 | Reynolds | |
| 8,054,300 B2 | 11/2011 | Bernstein | |
| 8,094,128 B2 | 1/2012 | Vu et al. | |
| 8,125,456 B2 | 2/2012 | Krah et al. | |
| 8,259,076 B2 | 9/2012 | Trent, Jr. et al. | |
| 8,358,142 B2 | 1/2013 | Maharyta | |
| 8,482,544 B2 | 7/2013 | Land et al. | |
| 8,493,355 B2 | 7/2013 | Geaghan et al. | |
| 8,493,359 B2 | 7/2013 | Wright et al. | |
| 8,508,495 B2 | 8/2013 | Hotelling et al. | |
| 8,634,127 B2 | 1/2014 | Shih et al. | |
| 8,766,931 B2 | 7/2014 | Westhues et al. | |
| 2005/0156881 A1 | 7/2005 | Trent, Jr. et al. | |
| 2006/0244733 A1 | 11/2006 | Geaghan | |
| 2007/0074914 A1 | 4/2007 | Geaghan et al. | |
| 2007/0247443 A1 | 10/2007 | Philipp | |
| 2008/0048997 A1 | 2/2008 | Gillespie et al. | |
| 2008/0157782 A1 | 7/2008 | Krah | |
| 2008/0158172 A1 | 7/2008 | Hotelling et al. | |
| 2008/0158183 A1 | 7/2008 | Hotelling et al. | |
| 2008/0162996 A1 | 7/2008 | Krah et al. | |
| 2008/0162997 A1 | 7/2008 | Vu et al. | |

(Continued)

*Primary Examiner* — Sahlu Okebato

(57) ABSTRACT

In a method of input object sensing, a plurality of transmitter electrodes are driven in a first way to acquire a first sub-frame image with the plurality of transmitter electrodes and a plurality of receiver electrodes of a sensor electrode pattern during a first sub-frame of a transcapacitive sensing frame. The plurality of transmitter electrodes is also driven in a second way to acquire a second sub-frame image with the plurality of transmitter electrodes and the plurality of receiver electrodes during a second sub-frame of the transcapacitive sensing frame, wherein the first way and the second way differ. A capacitive image is determined by combining the first sub-frame image with the second sub-frame image such that a motion artifact associated with an input object and present in at least one of the sub-frame images is suppressed by the combining.

20 Claims, 11 Drawing Sheets

(56) References Cited

U.S. PATENT DOCUMENTS

| | | |
|---|---|---|
| 2009/0284495 A1 | 11/2009 | Geaghan et al. |
| 2010/0001973 A1 | 1/2010 | Hotelling et al. |
| 2010/0060608 A1 | 3/2010 | Yousefpor |
| 2010/0164889 A1 | 7/2010 | Hristov et al. |
| 2010/0245286 A1 | 9/2010 | Parker |
| 2010/0292945 A1 | 11/2010 | Reynolds et al. |
| 2011/0006832 A1 | 1/2011 | Land et al. |
| 2011/0025629 A1 | 2/2011 | Grivna et al. |
| 2011/0061949 A1 | 3/2011 | Krah et al. |
| 2012/0013546 A1* | 1/2012 | Westhues et al. ............ 345/173 |
| 2012/0043971 A1 | 2/2012 | Maharyta |
| 2012/0050216 A1 | 3/2012 | Kremin et al. |
| 2012/0068964 A1 | 3/2012 | Wright et al. |
| 2012/0081335 A1 | 4/2012 | Land et al. |
| 2012/0182251 A1 | 7/2012 | Krah |
| 2012/0236392 A1* | 9/2012 | Shih et al. ..................... 359/296 |

\* cited by examiner

1100

DRIVING A PLURALITY OF TRANSMITTER ELECTRODES IN A FIRST WAY TO ACQUIRE A FIRST SUB-FRAME IMAGE WITH THE PLURALITY OF TRANSMITTER ELECTRODES AND A PLURALITY OF RECEIVER ELECTRODES OF A SENSOR ELECTRODE PATTERN DURING A FIRST SUB-FRAME OF A TRANSCAPACITIVE SENSING FRAME
1110

DRIVING THE PLURALITY OF TRANSMITTER ELECTRODES IN A SECOND WAY TO ACQUIRE A SECOND SUB-FRAME IMAGE WITH THE PLURALITY OF TRANSMITTER ELECTRODES AND THE PLURALITY OF RECEIVER ELECTRODES DURING A SECOND SUB-FRAME OF THE TRANSCAPACITIVE SENSING FRAME, WHEREIN THE FIRST WAY AND THE SECOND WAY DIFFER
1120

DETERMINING A CAPACITIVE IMAGE BY COMBINING THE FIRST SUB-FRAME IMAGE WITH THE SECOND SUB-FRAME IMAGE SUCH THAT A MOTION ARTIFACT ASSOCIATED WITH AN INPUT OBJECT AND PRESENT IN AT LEAST ONE OF THE ACQUIRED SUB-FRAME IMAGES IS SUPPRESSED BY THE COMBINING
1130

FIG. 11

TRANSCAPACITIVE INPUT OBJECT SENSING

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic system.

SUMMARY

In a method of input object sensing, a plurality of transmitter electrodes are driven in a first way to acquire a first sub-frame image with the plurality of transmitter electrodes and a plurality of receiver electrodes of a sensor electrode pattern during a first sub-frame of a transcapacitive sensing frame. The plurality of transmitter electrodes is also driven in a second way to acquire a second sub-frame image with the plurality of transmitter electrodes and the plurality of receiver electrodes during a second sub-frame of the transcapacitive sensing frame, wherein the first way and the second way differ. A capacitive image is determined by combining the first sub-frame image with the second sub-frame image such that a motion artifact associated with an input object and present in at least one of the sub-frame images is suppressed by the combining.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and:

FIG. 11 illustrates a flow diagram of a method of input object sensing, according to various embodiments.

DESCRIPTION OF EMBODIMENTS

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive input device. Embodiments associated with transcapacitive input object sensing are described herein. Utilizing techniques described herein, efficiencies may be achieved by performing two or more different types of transcapacitive scans to acquire sub-frame images of a transcapacitive sensing frame and then using the sub-frame images to determine a capacitive image for the transcapacitive sensing frame in which a motion artifact is suppressed in comparison to at least one of the sub-frame images.

Discussion begins with a description of an example input device with which or upon which various embodiments described herein may be implemented. An example sensor electrode pattern is then described. This is followed by description of an example processing system and some components thereof. The processing system may be utilized with or as a portion of an input device, such as a capacitive sensing input device. Operation of the capacitive sensing input device, processing system, and components thereof are then further described in conjunction with description of various techniques and methods of transcapacitive sensing.

Example Input Device

Figure 1:
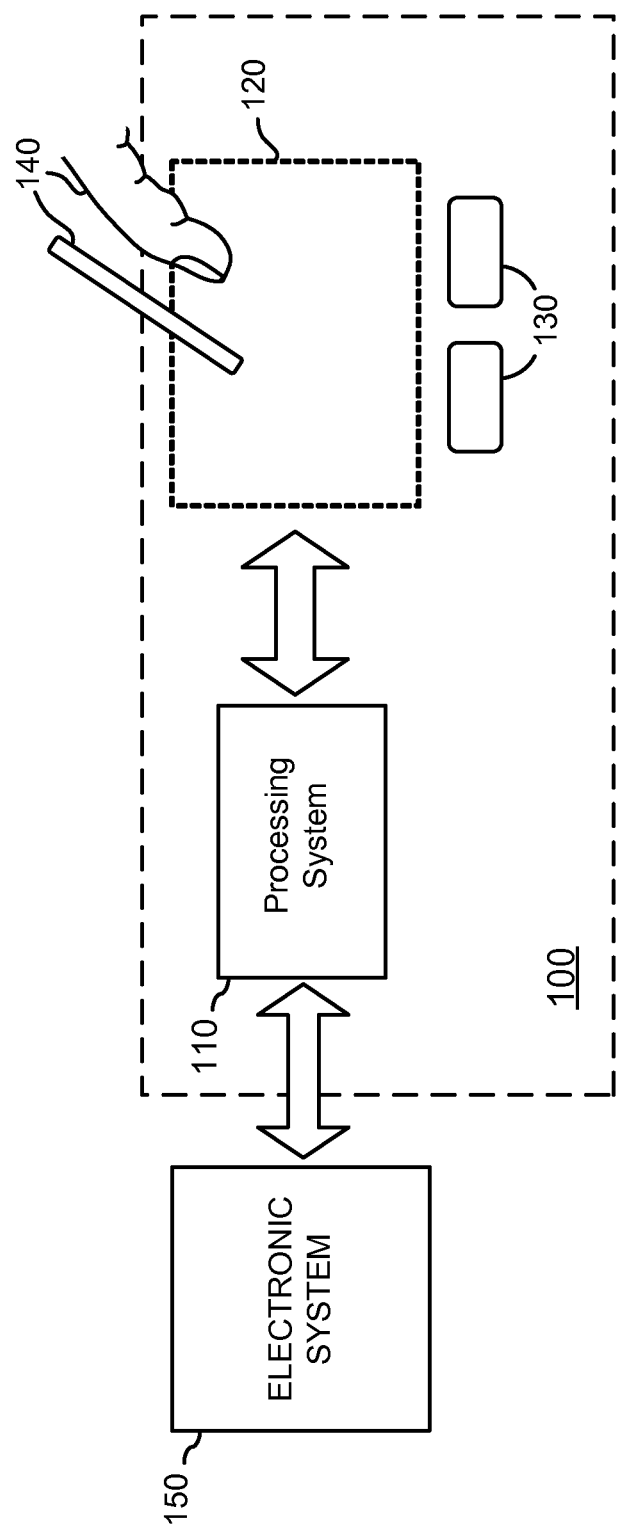
FIG. 1 is a block diagram of an example input device, in accordance with embodiments.

Turning now to the figures, FIG. 1 is a block diagram of an exemplary input device 100, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in sensing region 120. Input device 100 comprises one or more sensing elements for detecting user input. As a non-limiting example, input device 100 may use capacitive techniques.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance sensor device may comprise transmitter circuitry configured to drive signals on transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other tangible storage technology.

Sensor Electrode Pattern

Figure 2:
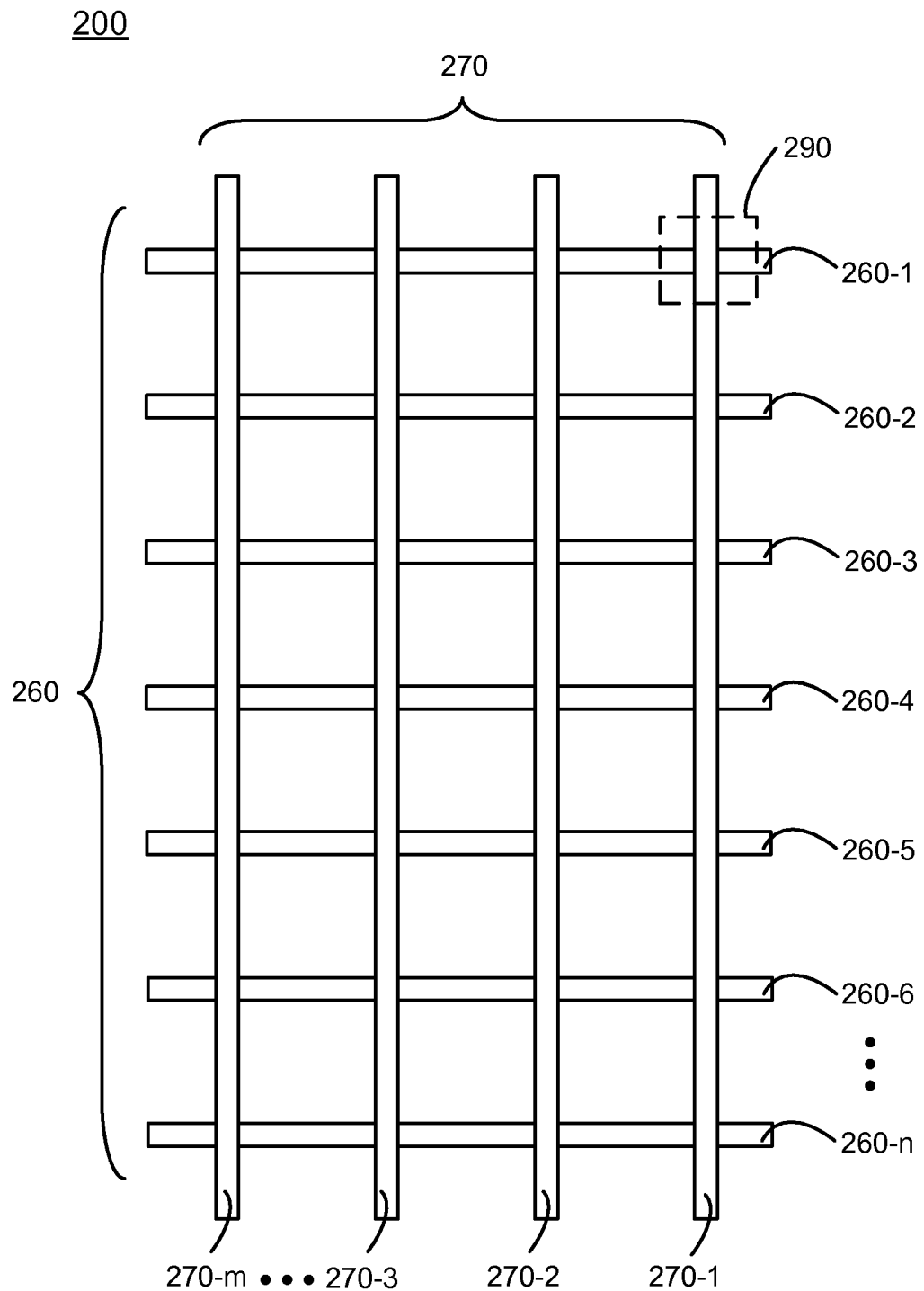
FIG. 2 shows a portion of an example sensor electrode pattern which may be utilized in a sensor to generate all or part of the sensing region of an input device, such as a touch screen, according to some embodiments.

FIG. 2 shows a portion of an example sensor electrode pattern 200 which may be utilized in a sensor to generate all or part of the sensing region of a input device 100, according to various embodiments. Input device 100 is configured as a capacitive input device when utilized with a capacitive sensor electrode pattern. For purposes of clarity of illustration and description, a non-limiting simple rectangular sensor electrode pattern 200 is illustrated. It is appreciated that numerous other sensor electrode patterns may be employed including patterns with two sets of sensor electrodes disposed in a single layer (without overlapping), and patterns that provide individual button electrodes. The illustrated sensor electrode pattern is made up of a plurality of receiver electrodes 270 (270-1, 270-2, 270-3 . . . 270-m) and a plurality of transmitter electrodes 260 (260-1, 260-2, 260-3, 260-4, 260-5, 260-6 . . . 260-n) which overlay one another, in this example. In the illustrated example, touch sensing pixels are centered at locations where transmitter and receiver electrodes cross. Capacitive pixel 290 illustrates one of the capacitive pixels generated by sensor electrode pattern 200 during transcapacitive sensing. It is appreciated that in a crossing sensor electrode pattern, such as the illustrated example, some form of insulating material or substrate is typically disposed between transmitter electrodes 260 and receiver electrodes 270. However, in some embodiments, transmitter electrodes 260 and receiver electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, such as capacitive pixel 290, are areas of localized capacitive coupling between transmitter electrodes 260 and receiver electrodes 270. The capacitive coupling between transmitter electrodes 260 and receiver electrodes 270 changes with the proximity and motion of input objects in the sensing region associated with transmitter electrodes 260 and receiver electrodes 270.

In some embodiments, sensor electrode pattern 200 is "scanned" to determine these capacitive couplings. That is, the transmitter electrodes 260 are driven to transmit transmitter signals. Transmitters may be operated such that one transmitter electrode at one time is driven with a transmitter signal, or multiple transmitter electrodes are driven with transmitter signals at the same time. Where multiple transmitter electrodes are driven with transmitter signals simultaneously, these multiple transmitter electrodes may transmit different transmitter signals according to one or more coding schemes that enable their combined effects on the resulting signals of receiver electrodes 270 to be independently determined.

The receiver electrodes 270 may be operated singly or multiply to acquire resulting signals. The resulting signals may be used to determine measurements of the capacitive couplings at the capacitive pixels.

A set of measurements from the capacitive pixels form a "capacitive image" or a "capacitive sub-frame image" (when there are multiple sub-frames in a capacitive sensing frame) representative of the capacitive couplings at the pixels as determined by transcapacitive sensing. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region. In some embodiments, as described herein, a single image may be determined from two or more capacitive sub-frame images.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Acquired capacitive images can be adjusted for/relative to the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image (or sub-frame) with appropriate "baseline values" of a "baseline image" associated with those pixels and a sensing technique used to acquire them, and determine changes from that baseline image.

Some techniques of transcapacitive scanning which employ coded scans of sensor electrodes that transmit on multiple sensor electrodes at once can result in capacitive images or sub-frame images that include motion artifacts. Motion artifacts occur when the input object is not stationary relative to the sensor electrodes being scanned. If severe enough, motion artifacts can result in false reporting of an input object or result in jitter with respect to the location of an actual input object. In general, the longer the chipping rate (length) of the code used and/or the longer a code is run, the better the result is for SNR purposes (increased SNR) and the worse the result is for motion artifact purposes (increased motion artifact). Additionally, the faster the movement of the input object, the worse the motion artifact becomes when using long codes and/or running codes for a long time.

In some embodiments, one or more sensor electrodes 260 or 270 may be operated to perform absolute capacitive sensing at a particular instance of time. For example, receiver electrode 270-1 may be charged and then the capacitance of receiver electrode 270-1 may be measured. In such an embodiment, an input object 140 interacting with receiver electrode 270-1 alters the electric field near receiver electrode 270-1, thus changing the measured capacitive coupling. In this same manner, a plurality of sensor electrodes 270 may be used to measure absolute capacitance and/or a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260 or 270 may simply be referred to as a "sensor electrode."

Example Processing System

Figure 3:
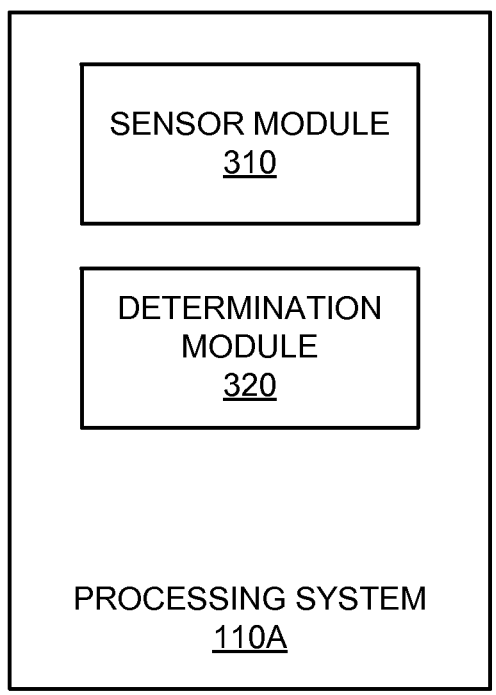
FIG. 3 shows a processing system with a capacitive charge measuring circuit, according to some embodiments.

FIG. 3 illustrates a block diagram of some components of an example processing system 110A that may be utilized with an input device (e.g., in place of processing system 110 as part of input device 100), according to various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more sensor electrodes of a first and second plurality (e.g., sensor electrodes 260 and 270) that implement a sensing region 120 of an input device 100. In some embodiments, processing system 110A and the input device 100 of which it is a part may be disposed in or communicatively coupled with an electronic system 150, such as a display device, computer, or other electronic system.

In one embodiment, processing system 110A includes, among other components: sensor module 310, and determination module 320. Processing system 110A and/or components thereof may be coupled with sensor electrodes of a sensor electrode pattern, such as sensor electrode pattern 200, among others. For example, sensor module 310 is coupled with one or more sensor electrodes (260, 270) of a sensor electrode pattern (e.g., sensor electrode pattern 200) of input device 100.

Sensor module 310 comprises sensor circuitry and operates to interact with the sensor electrodes of a sensor pattern that are utilized to generate a sensing region 120. This includes operating a first plurality of sensor electrodes (e.g., transmitter electrodes 270) to be silent, to be driven with a transmitter signal, to be used for transcapacitive sensing, and/or to be used for absolute capacitive sensing. This also includes operating a second plurality of sensor electrodes (e.g., receiver electrodes 270) to be silent, to be driven with a transmitter signal, to be used for transcapacitive sensing, and/or to be used for absolute capacitive sensing.

During transcapacitive sensing, sensor module 310 operates to drive transmitter signals on one or more sensor electrodes of a first plurality of sensor electrodes (e.g., one or more of transmitter electrodes 260). A transmitter signal may be a square wave, trapezoidal wave, or some other waveform. In a given time interval, sensor module 310 may drive or not drive a transmitter signal (waveform) on one or more of the plurality of sensor electrodes. Sensor module 310 may also be utilized to couple one or more of the first plurality of sensor electrodes to high impedance, ground, or to a constant voltage when not driving a transmitter signal on such sensor electrodes. In some embodiments, when performing transcapacitive sensing, sensor module 310 drives two or more transmitter electrodes of a sensor electrode pattern at one time. When driving two or more sensor electrodes of a sensor electrode pattern at once, the transmitter signal may be coded according to a code. Such codes include, but are not limited to: a code division multiplexing (CDM) code; an Ipatov code; a Maximum Length Sequence (MLS) code; a Legendre code; a Golay code; and a Barker code. Sensor module 310 also operates to receive resulting signals, via a second plurality of sensor electrodes (e.g., one or more of receiver electrodes 270) during transcapacitive sensing. During transcapacitive sensing, received resulting signals correspond to and include effects corresponding to the transmitter signal(s) transmitted via the first plurality of sensor electrodes. These transmitted transmitter signals may be altered or changed in the resulting signal due to presence of an input object, stray capacitance, noise, interference, and/or circuit imperfections among other factors, and thus may differ slightly or greatly from their transmitted versions.

During absolute capacitive sensing, sensor module 310 also operates to drive a transmitter signal on and receive a resulting signal from one or more of sensor electrodes 260 or 270. While performing absolute capacitive sensing, resulting signals may be received on one or a plurality of sensor electrodes during a time interval. In absolute capacitive sensing a sensor electrode is both driven and used to receive a resulting signal.

Sensor module 310 includes a plurality of amplifiers. Such amplifiers may be referred to herein as amplifiers, front-end amplifiers, integrating amplifiers, or the like, and receive a resulting signal at an input. The resulting signal is from a sensor electrode of a sensor electrode pattern, such as sensor electrode pattern 200.

Determination module 320 operates to compute/determine a measurement of a change in a transcapacitive capacitive coupling between a first and second sensor electrode during transcapacitive sensing. Determination module 320 then uses such measurements to determine the positional information comprising the position of an input object (if any) with respect to sensing region 120. The positional information can be determined from one or more individual capacitive sub-frame images and/or from a capacitive image determined from analysis/combination of capacitive sub-frame images. The capacitive image and sub-frame images are determined by determination module 320 based upon resulting signals acquired by sensor module 310. It is appreciated that determination module 320 operates to decode and reassemble coded resulting signals to construct a capacitive image and/or sub-frame image from a transcapacitive scan. When two or more different types of transcapacitive scans are performed in rapid sequence to gather sub-frame images of a transcapacitive sensing frame, determination module 320 operates to determine an overall capacitive image from the sub-frame images. In various embodiments, determination module 320 accomplishes this by comparing the sub-frame images and choosing one which has the smallest motion artifact and/or by combining multiple sub-frame images to determine a capacitive image with a suppressed motion artifact (in comparison to at least one of the combined sub-frame images).

In embodiments where absolute capacitive sensing is performed with sensor electrodes 260 and/or 270, determination module 320 also operates to compute/determine a measurement of absolute capacitive coupling to a sensor electrode. Determination module 320 may be implemented as hardware (e.g., hardware logic and/or other circuitry) and/or as a combination of hardware and instructions stored in a non-transitory manner in a computer readable storage medium.

In some embodiments, processing system 110A comprises decision making logic which directs one or more portions of processing system 110A, such as sensor module 310 and/or determination module 320, to operate in a selected one of a plurality of different operating modes based on various inputs.

Figure 4:
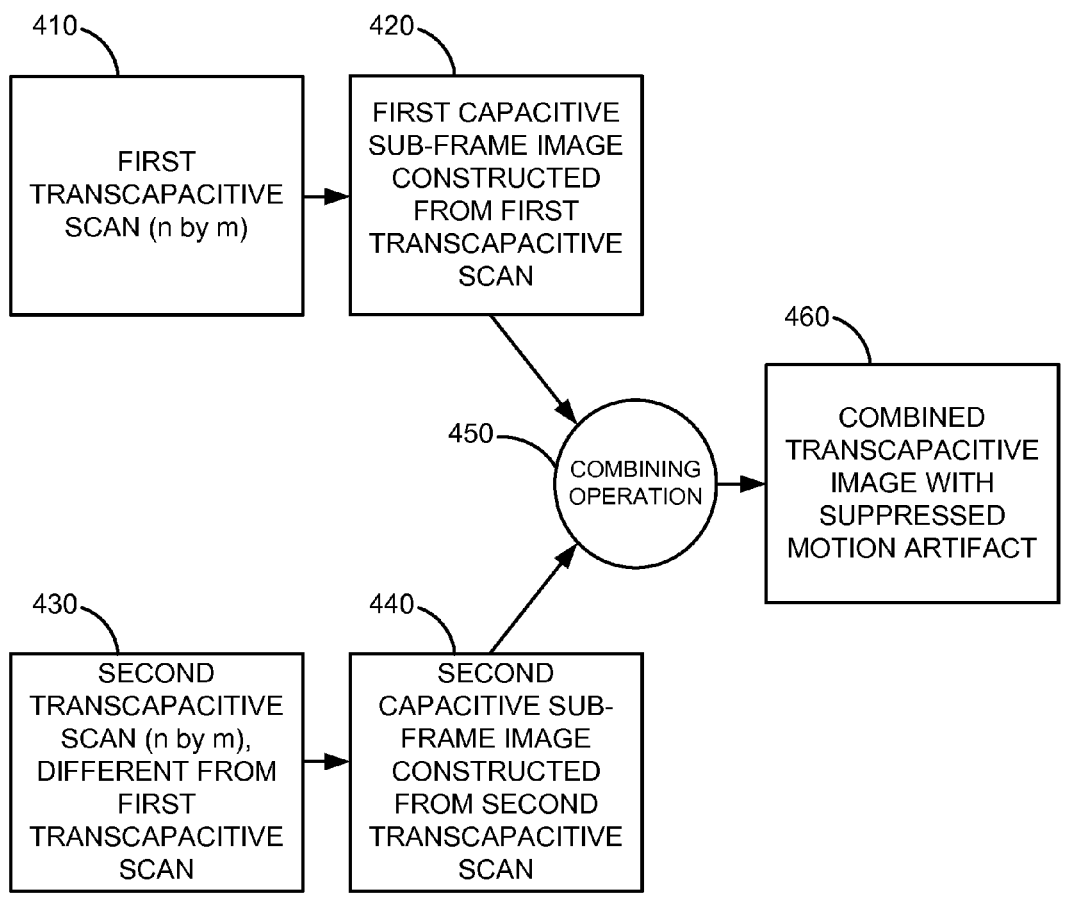
FIG. 4 shows a block diagram of a general technique for determining a combined capacitive image with suppressed motion artifact from sub-frame images constructed via different types of transcapacitive scans, according to various embodiments.

FIG. 4 illustrates a general technique 400 for determining a combined capacitive image with suppressed motion artifact from sub-frame images constructed via different types of transcapacitive scans, according to various embodiments. The different transcapacitive scans are conducted using an sensor electrode pattern of n transmitter sensor electrodes and m receiver electrodes. FIGS. 5-10 describe some example implementations in greater detail.

With reference to FIG. 4, at block 410 a first type of transcapacitive scan of n transmitter electrodes and m receiver electrodes is conducted according to a first scanning technique. In one embodiment, sensor module 310 directs this scan and acquires resulting signals.

At block 420, a first capacitive sub-frame image is constructed from the resulting signals acquired during the first transcapacitive scan. In one embodiment, determination module 320 determines this first capacitive sub-frame image by reconstructing resulting signals acquired via the first transcapacitive scan.

At block 430 a second type of transcapacitive scan of n transmitter electrodes and m receiver electrodes is conducted according to a second scanning technique that is different from the first scanning technique. In one embodiment, sensor module 310 directs this scan and acquires resulting signals. In some embodiments, the difference is that one of the first and second scanning techniques is accomplished according to a low-off peak auto correlation pseudo-random code while the other of the first and second scans is accomplished according to the complementary pair code of the low-off peak auto correlation pseudo-random code. In some embodiments, the difference is that one of the first and second scanning techniques is accomplished according to a high signal to noise ratio (SNR) scanning technique while the other of the first and second scans is accomplished according to according to a lower SNR scanning technique which results in an image with a lower motion artifact than the high SNR scanning technique. In some embodiments, the difference is that one of the first and second scanning techniques is accomplished according to a particular code technique while the other of the first and second scans is accomplished according to the same particular code technique with the addition of row reversal of the code and some offset of the starting point (i.e., starting the two scans on different transmitter electrodes).

At block 440, a second capacitive sub-frame image is constructed from the resulting signals acquired during the second transcapacitive scan. In one embodiment, determination module 320 determines this second capacitive sub-frame image by reconstructing resulting signals acquired during the second transcapacitive scan.

At block 450, a combining operation is performed on the sub-frame images. In one embodiment, determination module 320 performs the combining operation. The combining operation can be done on a per-pixel basis for each x/y axis pixel location common to the sub-frame images and comprise any of a variety of operations, including: addition of like located capacitive pixels (i.e., same x/y axis pixel location) in combined sub-frame images (Equation 1); subtraction of like located capacitive pixels in combined capacitive sub-frame images (Equation 2); multiplication of like located pixels in combined sub-frame images (Equation 3); Boolean operation (e.g., AND, XOR, OR, or the like) upon like located capacitive pixels in combined sub-frames images (Equation 4); averaging values of like located capacitive pixels in combined sub-frame images (Equation 5); and spatial filtering upon capacitive pixels (e.g., dot product taken across immediate neighboring pixels of each x/y axis pixel location) in combined sub-frame images (Equation 6). In Equations 1-6, i, j, and k are pixel locations and i is the same x/y axis pixel location as j and k.

$$\text{Combined}[k] = \text{SubFrameOne}[i] + \text{SubFrameTwo}[j] \quad \text{Equation 1}$$

$$\text{Combined}[k] = \text{SubFrameOne}[i] - \text{SubFrameTwo}[j] \quad \text{Equation 2}$$

$$\text{Combined}[k] = \text{SubFrameOne}[i] * \text{SubFrameTwo}[j] \quad \text{Equation 3}$$

$$\text{CombinedImage}[k] = \text{SubFrameOne}[i] \, \& \, \text{SubFrameTwo}[j] \quad \text{Equation 4}$$

$$\text{CombinedImage}[k] = (\text{SubFrameOne}[i] + \text{SubFrameTwo}[j])/2 \quad \text{Equation 5}$$

$$\text{CombinedImage}[k] = \text{SubFrameOne}[i-1]*\text{SubFrameTwo}[j-1] + \text{SubFrameOne}[i]*\text{SubFrameTwo}[j] + \text{SubFrameOne}[i+1]*\text{SubFrameTwo}[j+1] \quad \text{Equation 6}$$

Block 460 illustrates that the output of the combining operation (block 450) is a combined capacitive image with a suppressed motion artifact in comparison to at least one of the combined sub-frames. In many embodiments, the combined capacitive image also has a higher SNR in comparison to at least one of the sub-frame images used in its creation.

Figure 5:
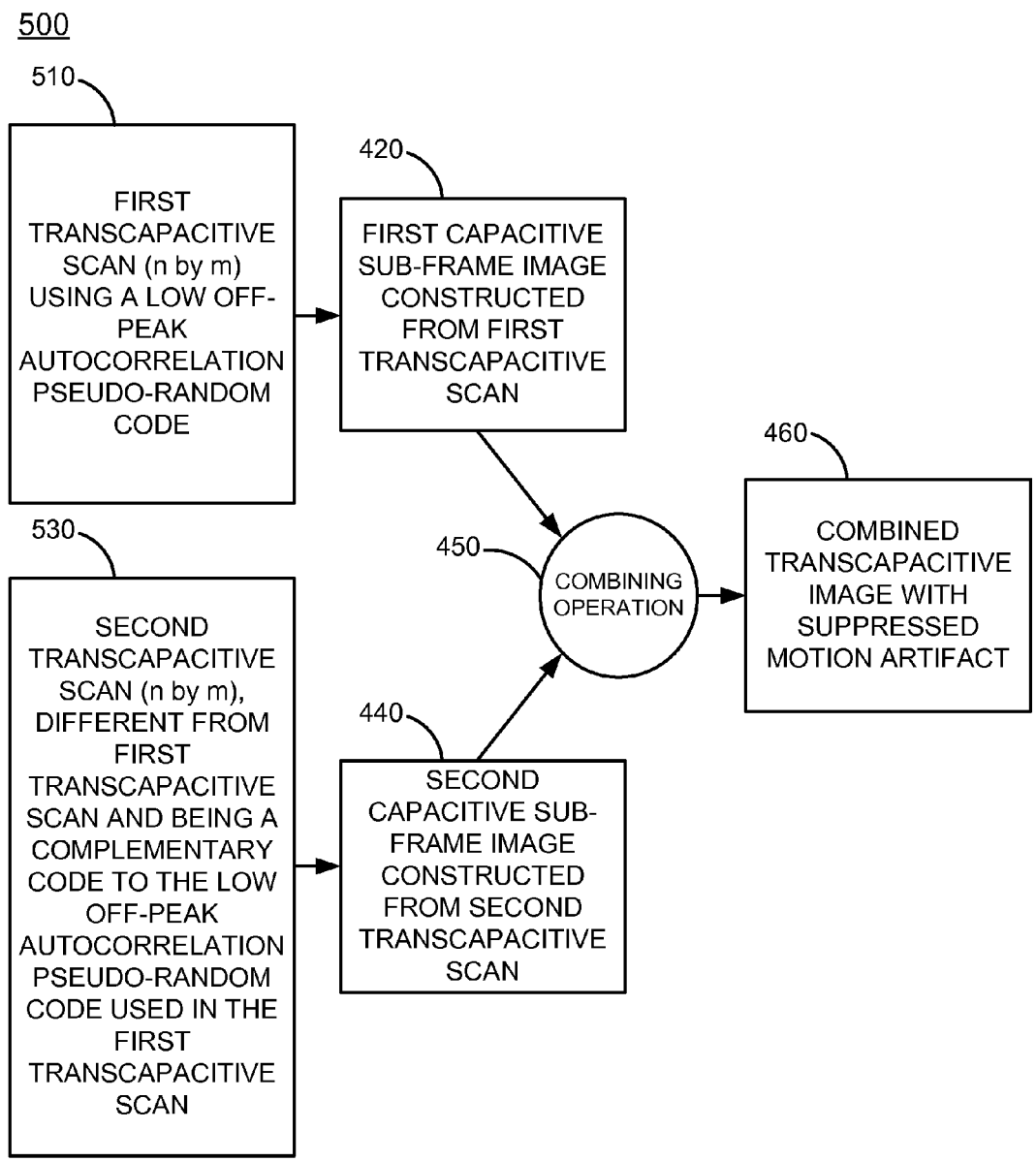
FIG. 5 shows a block diagram of a particular technique for determining a combined capacitive image with suppressed motion artifact from sub-frame images constructed via different types of transcapacitive scans, according to various embodiments.

FIG. 5 shows a block diagram 500 of a particular technique for determining a combined capacitive image with suppressed motion artifact from sub-frame images constructed via different types of transcapacitive scans, according to various embodiments. Block diagram 500 describes some particular implementations of the general technique shown in block diagram 400 of FIG. 4, and thus like numbered blocks represent like operations.

At block 510 a first type of transcapacitive scan of n transmitter electrodes and m receiver electrodes is conducted according to a first scanning technique. In one embodiment, sensor module 310 directs this scan to acquire resulting signals for a first sub-frame image with a plurality of transmitter electrodes and with a plurality of receiver electrodes of the sensor electrode pattern. For example, during a first sub-frame of a transcapacitive sensing frame, sensor module 310 drives a plurality of transmitter electrodes in a first way with a coded transmission that is coded according to a first code (e.g., a Golay code) which has a complementary pair code which has low off-peak autocorrelation to the first code. More than one and up to all transmitter electrodes in a sensor electrode pattern may be driven simultaneously in this first way.

At block 420 of FIG. 5, a first capacitive sub-frame image is constructed from the resulting signals that sensor module 310 acquires from the receiver electrodes during the first transcapacitive scan. In one embodiment, determination module 320 determines this first capacitive sub-frame image by reconstructing resulting signals acquired during the first transcapacitive scan.

At block 530 a second type of transcapacitive scan of the n transmitter electrodes and m receiver electrodes is conducted according to a second scanning technique. In one embodiment, sensor module 310 directs this second scan to acquire resulting signals for a second sub-frame image with the same plurality of transmitter electrodes and with the same plurality of receiver electrodes. For example, during a second sub-frame of the transcapacitive sensing frame, sensor module 310 drives the plurality of transmitter electrodes in a second way with the complementary pair code to the code used during the first sub-frame. Typically, the same number of transmitters are driven simultaneously as were driven simultaneously during the first sub-frame.

At block 440 of FIG. 5, a second capacitive sub-frame image is constructed from the resulting signals that sensor module 310 acquires from the receiver electrodes during the second transcapacitive scan. In one embodiment, determination module 320 determines this second capacitive sub-frame image by reconstructing resulting signals acquired during the second transcapacitive scan.

At block 450 of FIG. 5, a combining operation is performed on the sub-frame images. In one embodiment, determination module 320 performs the combining operation. The combining operation can be done on a per-pixel basis for each x/y axis pixel location common to the sub-frame images and comprise any of a variety of operations, including: addition of like located capacitive pixels (i.e., same x/y axis pixel location) in combined sub-frame images (Equation 1); subtraction of like located capacitive pixels in combined capacitive sub-frame images (Equation 2); multiplication of like located pixels in combined sub-frame images (Equation 3); Boolean operation (e.g., AND, XOR, OR, or the like) upon like located capacitive pixels in combined sub-frames images (Equation 4); averaging values of like located capacitive pixels in combined sub-frame images (Equation 5); and spatial filtering upon capacitive pixels (e.g., dot product taken across immediate neighboring pixels of each x/y axis pixel location) in combined sub-frame images (Equation 6). In Equations 1-6, i, j, and k are pixel locations and i is the same x/y axis pixel location as j and k.

Block 460 of FIG. 5 illustrates that the output of the combining operation (block 450 of FIG. 5) is a combined capacitive image with a suppressed motion artifact in comparison to at least one of the combined sub-frames. The motion artifact is suppressed and to some extent cancelled out by the combining process. For example, when using a technique such as multiplication to combine the first and second sub-frame images any zero pixel value in either image causes a zero value in the corresponding pixel value of the combined image. While both images may have motion artifacts, they will have low-correlation to one another and thus a good deal of this cancelling can take place. When using multiplication to combine the first and second sub-frame images, the combined capacitive image also has a higher SNR than either of the combined sub-frame images, this is because there is a correlation in the peak areas and these correlated peaks are multiplied to create a greater peak at the location of the input object.

Determination module 320 can determine a position of an input object within the combined capacitive image using techniques that are well known in the art.

Figure 6:
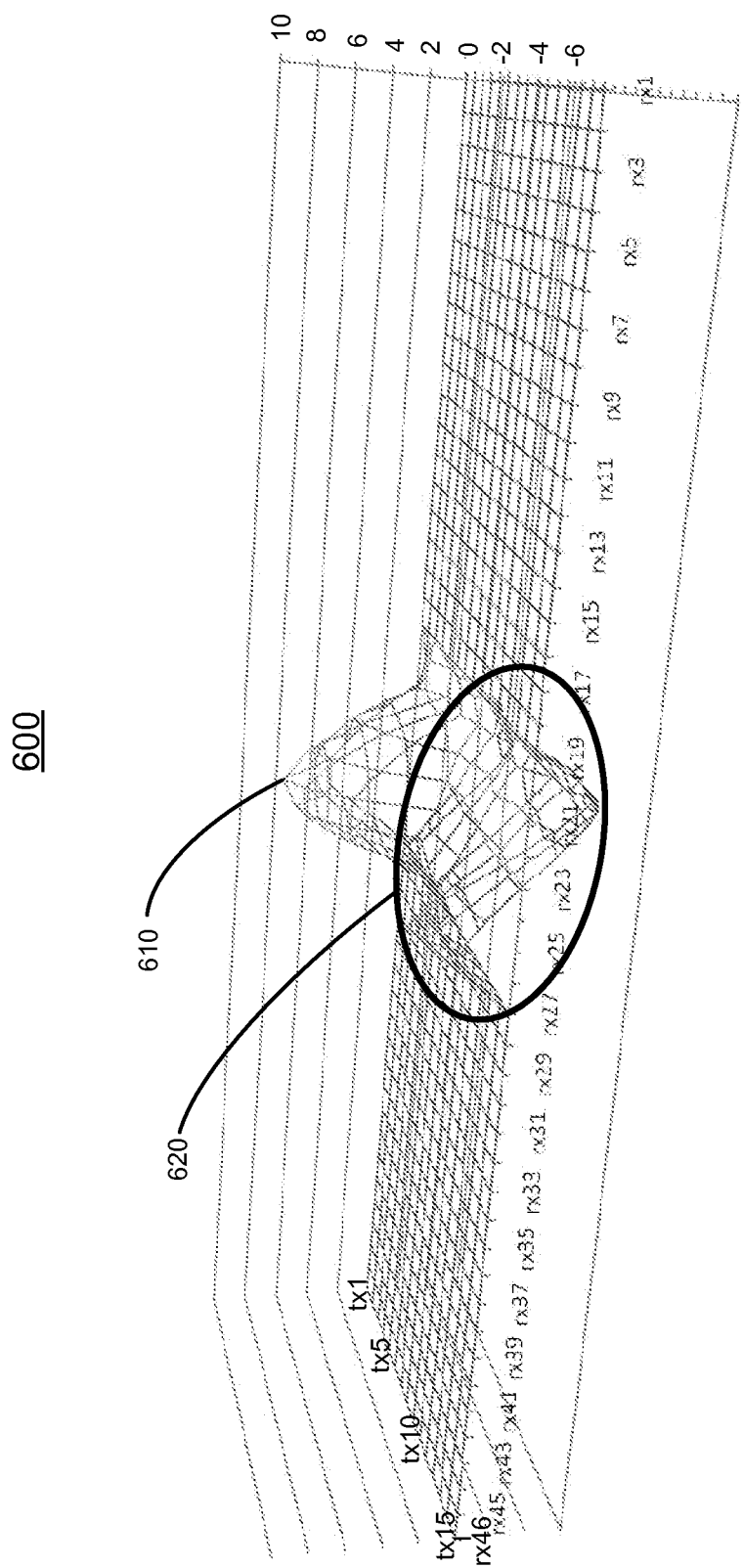
FIG. 6 shows a capacitive sub-frame image constructed from resulting signals obtained after a transcapacitive scan using a first complementary low off-peak correlation scanning code.

FIG. 6 shows a capacitive sub-frame image 600 constructed from resulting signals obtained after a transcapacitive scan using a first complementary low off-peak correlation scanning code. The capacitive sensing pattern includes 15 transmitter electrodes (tx1 . . . tx15) and 46 receiver electrodes (rx1 . . . rx46). In one embodiment, sub-frame image 600 corresponds to a sub-frame image constructed at block 420 of FIG. 5. Peak 610 illustrates an approximately 7.5 mV peak associated with a moving input object which is moving right to left (with respect to the sub-frame image) at approximately 75 cm/second, and region 620 illustrates a motion artifact that exists in this sub-frame image.

Figure 7:
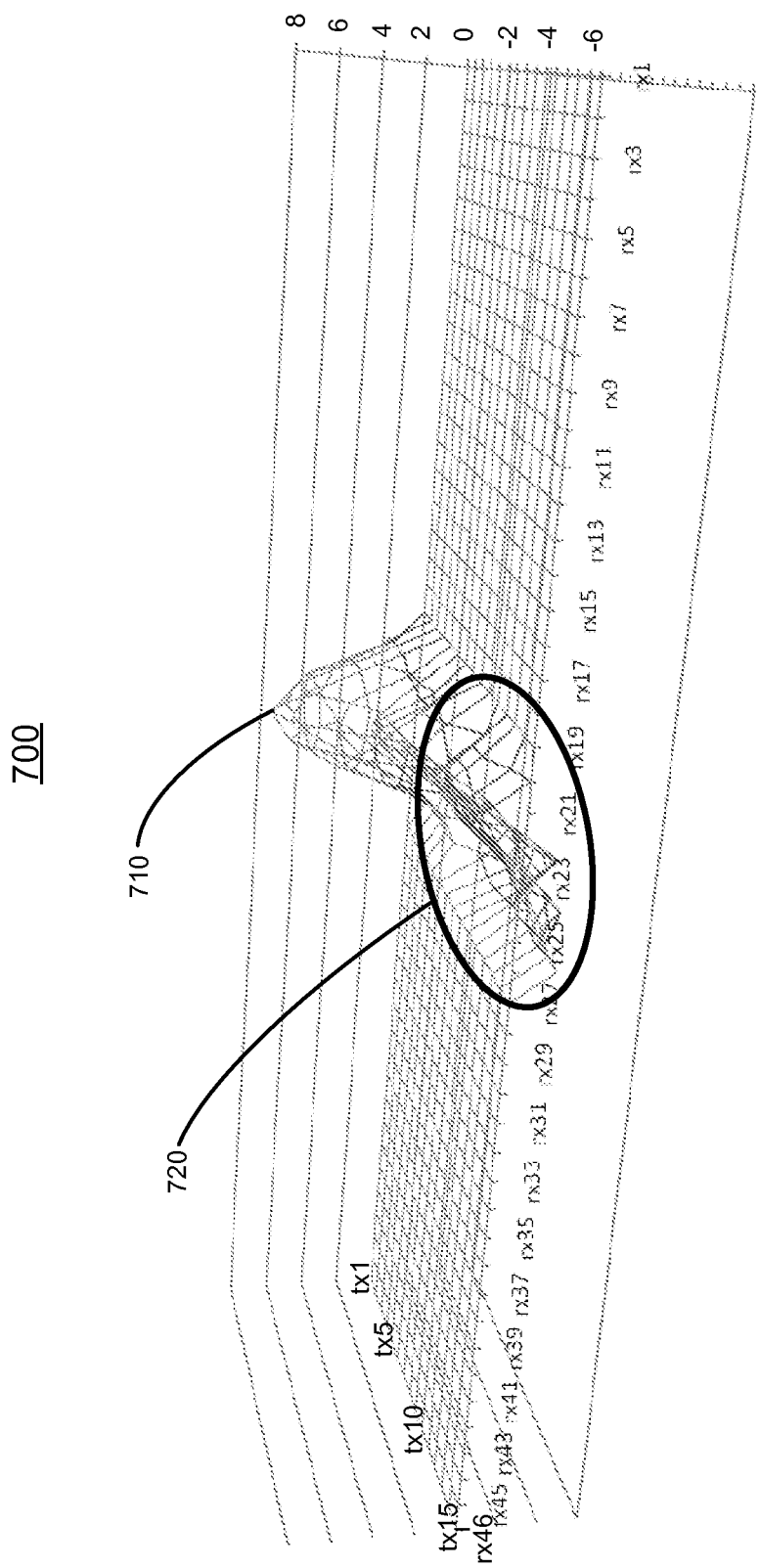
FIG. 7 shows a capacitive sub-frame image constructed from resulting signals obtained after a transcapacitive scan using a second complementary low off-peak correlation scanning code.

FIG. 7 shows a capacitive sub-frame image 700 constructed from resulting signals obtained after a transcapacitive scan using a second complementary low off-peak correlation scanning code. Capacitive sub-frame image 700 has been captured either slightly before or slightly after the captured of capacitive sub-frame image 700, using the same sensor electrodes of the same sensor electrode pattern. In one embodiment, sub-frame image 700 corresponds to a sub-frame image constructed at block 440 of FIG. 5. Peak 710 illustrates an approximately 7.5 mV peak associated with a moving input object which is moving right to left (with respect to the sub-frame image) at approximately 75 cm/second, and region 720 illustrates a motion artifact that exists in this sub-frame image. While motion artifacts 620 and 720 are located in approximately the same regions as one another, their content has very low correlation.

Figure 8:
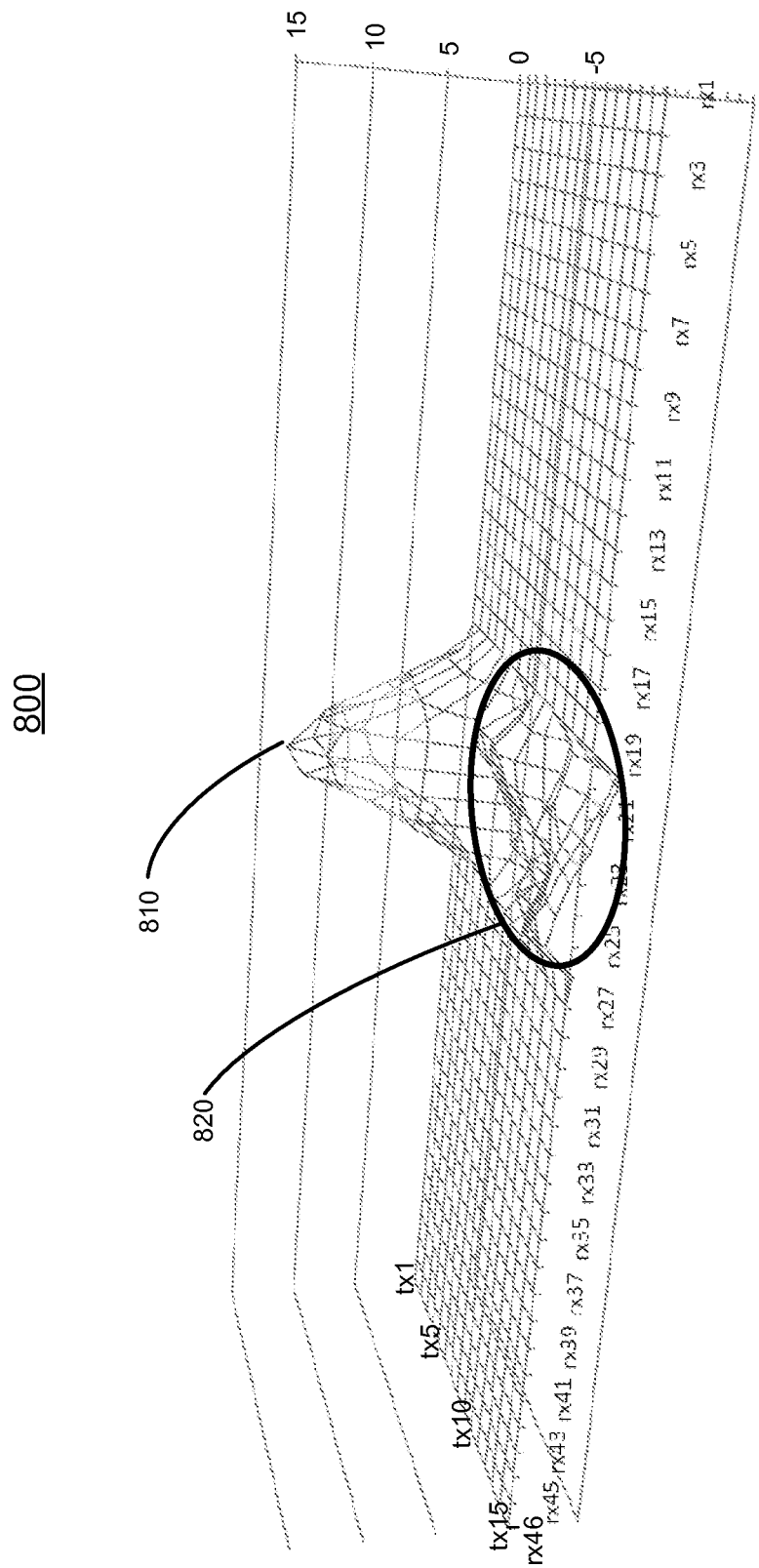
FIG. 8 shows a capacitive image with a suppressed motion artifact as determined by combining the sub-frame images illustrated in FIGS. 6 and 7.

FIG. 8 shows a capacitive image 800 with a suppressed motion artifact as determined by combining the sub-frame images illustrated in FIGS. 6 and 7. A combination of sub-frame images 600 on 700 through a combining operation such as addition (e.g., Equation 1) results in combined capacitive image 800. Peak 810 corresponds to the location of the input object and is now at approximately 13 mV, while the motion artifact in region 820 is suppressed in comparison to the motion artifacts in either region 620 or region 720.

Figure 9:
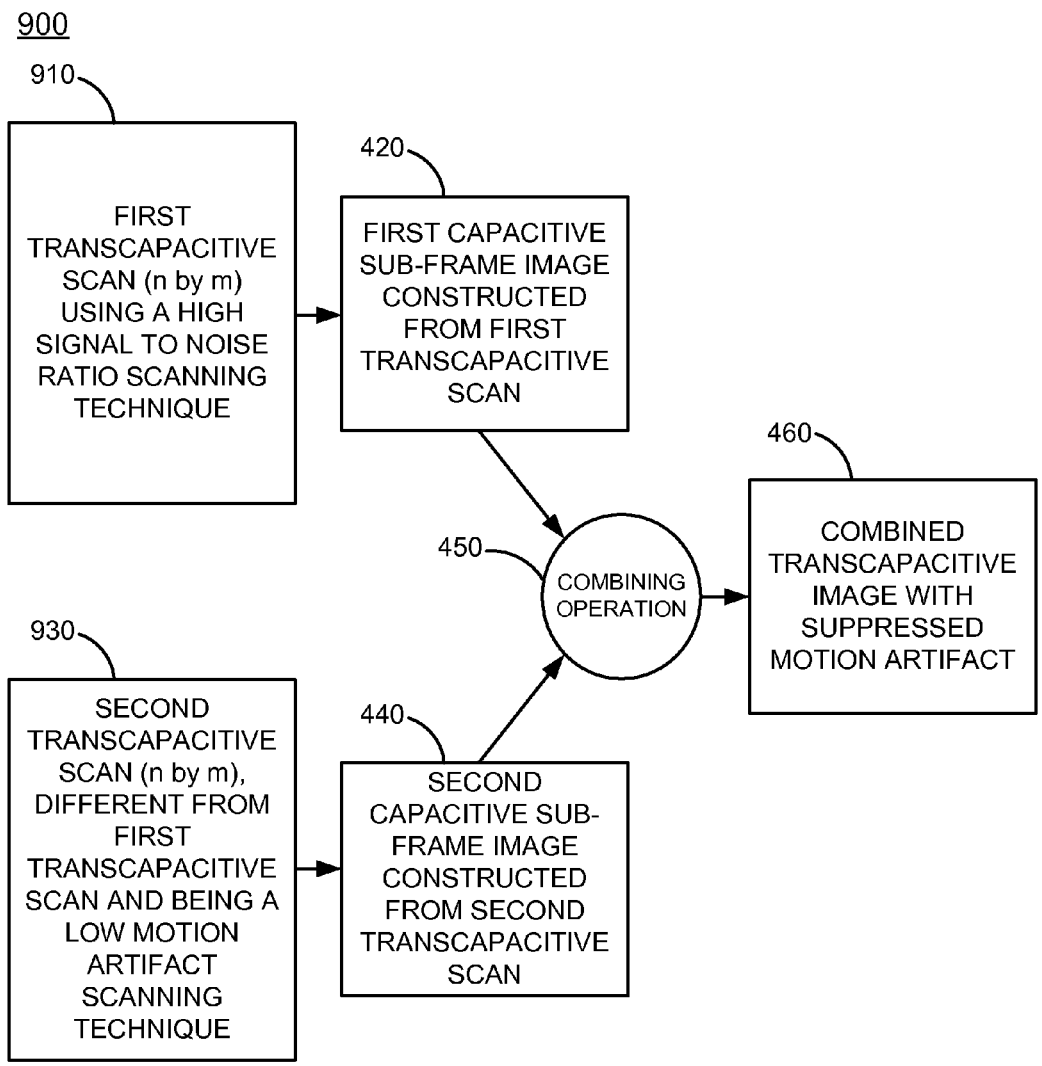
FIG. 9 illustrates a particular technique for determining a combined capacitive image with suppressed motion artifact from sub-frame images constructed via different types of transcapacitive scans, according to various embodiments.

FIG. 9 shows a block diagram 900 of a particular technique for determining a combined capacitive image with suppressed motion artifact from sub-frame images constructed via different types of transcapacitive scans, according to various embodiments. Block diagram 900 describes some particular implementations of the general technique shown in block diagram 400 of FIG. 4, and thus like numbered blocks represent like operations.

At block 910 a first type of transcapacitive scan of n transmitter electrodes and m receiver electrodes is conducted according to a first scanning technique. In one embodiment, sensor module 310 directs this scan to acquire resulting signals for a first sub-frame image with a plurality of transmitter electrodes and with a plurality of receiver electrodes of the sensor electrode pattern. For example, during a first sub-frame of a transcapacitive sensing frame, sensor module 310 drives a plurality of transmitter electrodes in a first way with a coded transmission that is coded according to a code that achieves a SNR result. One example of such a code is a division multiplex (CDM) code. More than one and up to all transmitter electrodes in a sensor electrode pattern may be driven simultaneously in this first way.

At block 420 of FIG. 9, a first capacitive sub-frame image is constructed from the resulting signals that sensor module 310 acquires from the receiver electrodes during the first transcapacitive scan. In one embodiment, determination module 320 determines this first capacitive sub-frame image by reconstructing resulting signals acquired during the first transcapacitive scan.

At block 930 a second type of transcapacitive scan of the n transmitter electrodes and m receiver electrodes is conducted according to a second scanning technique. In one embodiment, sensor module 310 directs this second scan to acquire resulting signals for a second sub-frame image with the same plurality of transmitter electrodes and with the same plurality of receiver electrodes. For example, during a second sub-frame of the transcapacitive sensing frame, sensor module 310 drives the plurality of transmitter electrodes in a second way with a coding technique which will result in a lower motion artifact than the coding technique used in the first sub-frame. For example, if a code division multiplex (CDM) code is used in the first sub-frame, a progressive scan may be employed in the second sub-frame. The progressive scan will only drive a sensing waveform on one transmitter electrode at a time, and thus will produce no motion artifact in its resulting sub-frame image; however, it will have a lower SNR than the first sub-frame image produced from a higher order CDM code. In another embodiment, if a higher order CDM code is used in the first sub-frame, a lower order CDM code may be employed in the second sub-frame. The lower order code will have a less pronounced motion artifact in its resulting waveform; however it will also have a lower SNR than the first sub-frame image produced from a higher order CDM code. An example of a higher order code is an order 16 CDM code (a code that is driven on 16 transmitters at once). An example of a lower order CDM code would be any CDM code that has a shorter code length than the higher order code being utilized. In the example where an order 16 code is the higher order CDM code, an order 4 CDM would be one example of a lower order CDM code.

At block 440 of FIG. 9, a second capacitive sub-frame image is constructed from the resulting signals that sensor module 310 acquires from the receiver electrodes during the second transcapacitive scan. In one embodiment, determination module 320 determines this second capacitive sub-frame image by reconstructing resulting signals acquired during the second transcapacitive scan.

At block 450 of FIG. 9, a combining operation is performed on the sub-frame images. In one embodiment, determination module 320 performs the combining operation. The combining operation can be done on a per-pixel basis for each x/y axis pixel location common to the sub-frame images and comprise any of a variety of operations, including: addition of like located capacitive pixels (i.e., same x/y axis pixel location) in combined sub-frame images (Equation 1); subtraction of like located capacitive pixels in combined capacitive sub-frame images (Equation 2); multiplication of like located pixels in combined sub-frame images (Equation 3); Boolean operation (e.g., AND, XOR, OR, or the like) upon like located capacitive pixels in combined sub-frames images (Equation 4); averaging values of like located capacitive pixels in combined sub-frame images (Equation 5); and spatial filtering upon capacitive pixels (e.g., dot product taken across immediate neighboring pixels of each x/y axis pixel location) in combined sub-frame images (Equation 6). In Equations 1-6, i, j, and k are pixel locations and i is the same x/y axis pixel location as j and k.

Block 460 of FIG. 9 illustrates that the output of the combining operation (block 450 of FIG. 9) is a combined capacitive image with a suppressed motion artifact in comparison to at least one of the combined sub-frames. The motion artifact is suppressed and to some extent cancelled out by the combining process. For example, in an embodiment where a CDM code is used for scanning during the first sub-frame and a progressive code is used for scanning during the second sub-frame, a Boolean operation such as ANDing can be used to combine the first and second sub-frame images. ANDing causes any zero pixel value in either image causes a zero value in the corresponding pixel value of the combined image.

Determination module 320 can determine a position of an input object within the combined capacitive image using techniques that are well known in the art.

Figure 10:
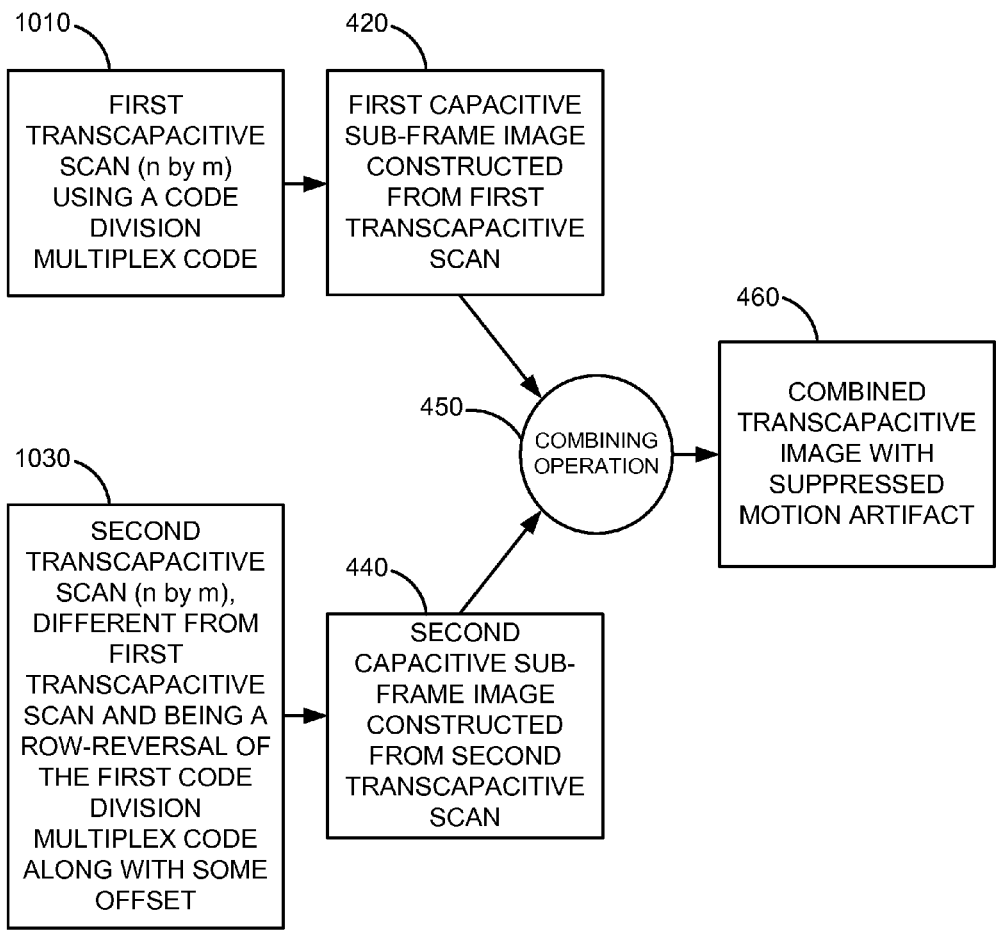
FIG. 10 illustrates a particular technique for determining a combined capacitive image with suppressed motion artifact from sub-frame images constructed via different types of transcapacitive scans, according to various embodiments.

FIG. 10 illustrates a particular technique for determining a combined capacitive image with suppressed motion artifact from sub-frame images constructed via different types of transcapacitive scans, according to various embodiments; and FIG. 10 shows a block diagram 1000 of a particular technique for determining a combined capacitive image with suppressed motion artifact from sub-frame images constructed via different types of transcapacitive scans, according to various embodiments. Block diagram 1000 describes some particular implementations of the general technique shown in block diagram 400 of FIG. 4, and thus like numbered blocks represent like operations.

At block 1010 a first type of transcapacitive scan of n transmitter electrodes and m receiver electrodes is conducted according to a first scanning technique. In one embodiment, sensor module 310 directs this scan to acquire resulting signals for a first sub-frame image with a plurality of transmitter electrodes and with a plurality of receiver electrodes of the sensor electrode pattern. For example, during a first sub-frame of a transcapacitive sensing frame, sensor module 310 drives a plurality of transmitter electrodes in a first way with a coded transmission that is coded according to a code that achieves a high SNR result. One example of such a code is a division multiplex (CDM) code. More than one and up to all transmitter electrodes in a sensor electrode pattern may be driven simultaneously in this first way.

At block 420 of FIG. 10, a first capacitive sub-frame image is constructed from the resulting signals that sensor module 310 acquires from the receiver electrodes during the first transcapacitive scan. In one embodiment, determination module 320 determines this first capacitive sub-frame image by reconstructing resulting signals acquired during the first transcapacitive scan.

At block 1030 a second type of transcapacitive scan of the n transmitter electrodes and m receiver electrodes is conducted according to a second scanning technique. In one embodiment, sensor module 310 directs this second scan to acquire resulting signals for a second sub-frame image with the same plurality of transmitter electrodes and with the same plurality of receiver electrodes. For example, during a second sub-frame of the transcapacitive sensing frame, sensor module 310 drives the plurality of transmitter electrodes in a second way with the same coding technique being row reversed (i.e., positive values and negative values are reversed from the CDM code used in the first sub-frame) and offset to start on a different transmitter electrode location in the sensor electrode pattern than the transmitter electrode that the CDM code was started on during the first sub-frame. For example, if an order 12 CDM code is used in the first sub-frame, the same order 12 CDM code can be utilized in the second sub-frame after applying row-reversal and some offset. The first and second sub-frame images should have similar SNR, they also have non-correlated motion artifacts that will cancel to some extent when the first and second sub-frame images are combined.

At block 440 of FIG. 10, a second capacitive sub-frame image is constructed from the resulting signals that sensor module 310 acquires from the receiver electrodes during the second transcapacitive scan. In one embodiment, determination module 320 determines this second capacitive sub-frame image by reconstructing resulting signals acquired during the second transcapacitive scan.

At block 450 of FIG. 10, a combining operation is performed on the sub-frame images. In one embodiment, determination module 320 performs the combining operation. The combining operation can be done on a per-pixel basis for each x/y axis pixel location common to the sub-frame images and comprise any of a variety of operations, including: addition of like located capacitive pixels (i.e., same x/y axis pixel location) in combined sub-frame images (Equation 1); subtraction of like located capacitive pixels in combined capacitive sub-frame images (Equation 2); multiplication of like located pixels in combined sub-frame images (Equation 3); Boolean operation (e.g., AND, XOR, OR, or the like) upon like located capacitive pixels in combined sub-frames images (Equation 4); averaging values of like located capacitive pixels in combined sub-frame images (Equation 5); and spatial filtering upon capacitive pixels (e.g., dot product taken across immediate neighboring pixels of each x/y axis pixel location) in combined sub-frame images (Equation 6). In Equations 1-6, i, j, and k are pixel locations and i is the same x/y axis pixel location as j and k.

Block 460 of FIG. 10 illustrates that the output of the combining operation (block 450 of FIG. 10) is a combined capacitive image with a suppressed motion artifact in comparison to at least one of the combined sub-frames. The motion artifact is suppressed and to some extent cancelled out by the combining process. For example, in an embodiment where a CDM code is used for scanning during the first sub-frame and a row-reversal of the CDM code with offset is used for scanning during the second sub-frame, a Boolean operation such as ANDing can be used to combine the first and second sub-frame images. ANDing causes any zero pixel value in either image causes a zero value in the corresponding pixel value of the combined image.

Determination module 320 can determine a position of an input object within the combined capacitive. For example, techniques that are well known in the art for position determination with respect to conventional transcapacitive images can be employed to determine a position of the input object within the combined capacitive image.

FIG. 11 illustrates a flow diagram 1100 of a method of input object sensing, according to various embodiments. Procedures of this method will be described with reference to elements and/or components of one or more of FIGS. 1-10. It is appreciated that in some embodiments, the procedures may be performed in a different order than described, that some of the described procedures may not be performed, and/or that one or more additional procedures to those described may be performed.

With reference to FIG. 11, at procedure 1110 of flow diagram 1100, in one embodiment, a plurality of transmitter electrodes is driven in a first way to acquire a first sub-frame image with the plurality of transmitter electrodes and a plurality of receiver electrodes of a sensor electrode pattern during a first sub-frame of a transcapacitive sensing frame. Sensor module 310 of processing system 110A accomplishes this driving in various embodiments. Reference is made to the previous description of block 410 of FIG. 4, block 510 of FIG. 5, block 910 of FIG. 9, and block 1010 of FIG. 10 for description of techniques that are used, in various embodiments, to drive a plurality of sensor electrodes in a first way during a first sub-frame of a transcapacitive sensing frame. In various embodiments, the first way may comprise driving the transmitter electrodes with a CDM code or a code which as a complementary pair code with low off-peak autocorrelation. In various embodiments, up to all of the transmitter electrodes in a sensor electrode pattern may be driven simultaneously in the first way during the first sub-frame.

At procedure 1120 of flow diagram 1100, in some embodiments, a plurality of transmitter electrodes is driven in a second way to acquire a second sub-frame image with the plurality of transmitter electrodes and the plurality of receiver electrodes during a second sub-frame of the transcapacitive sensing frame. The first way and the second way of driving differ. Reference is made to the previous description of block 430 of FIG. 4, block 530 of FIG. 5, block 930 of FIG. 9, and block 1030 of FIG. 10 for description of techniques that are used, in various embodiments, to drive a plurality of sensor electrodes in a second way during a second sub-frame of a transcapacitive sensing frame.

With reference to 910 of FIG. 9, in some embodiments, the first way may comprise driving with a high signal to noise ratio scanning technique during the first sub-frame and driving with a low motion artifact scanning technique during the second sub-frame. For example, in some embodiments, when a CDM code is used to drive the transmitter electrodes during the first sub-frame, a progressive scan may be used to drive the transmitter electrodes in the second way during the second sub-frame. Such progressive scanning may be conducted as a sequential scanning, one at a time, across a collection of transmitter electrodes of a sensor electrode pattern or may be conducted according to a pattern or random order that either of which is accomplished one transmitter at a time on a non-sequential basis across a collection of transmitter electrodes in a sensor electrode pattern. In other embodiments, a higher order CDM code (e.g., order 24) is used to drive the transmitter electrodes in the first way during the first sub-frame and a lower order CDM code (e.g., order 8) is used to drive the sensor electrodes in a second way during the second sub-frame. The order of the CDM codes refers to the chip rate or how many bits in the length the code.

With reference to 1010 of FIG. 10, in some embodiments, the first way may comprise using a CDM code to drive the transmitter electrodes in the first way during the first sub-frame and using a row-reversal of the CDM code and a transmitter offset to drive the transmitter electrodes in the second way during the second sub-frame. The same coding technique is used, but the row reversal reverses the polarity of the driven waveform and the transmitter offset causes the code to begin on a different transmitter location within a sensor electrode pattern in each of the first and second sub-frames.

In one embodiment, as described in blocks 510 and 530 when the first way comprises a code which has a complementary pair code with low off-peak autocorrelation the second way comprises driving the transmitter electrodes with the complementary pair code of the code used in the first way of driving. A Golay code and its complementary pair code are but one example of codes with low off-peak autocorrelation that can be used to drive the transmitter electrodes during the first and second sub-frames.

At procedure 1130 of flow diagram 1100, in one embodiment, a capacitive image is determined by combining the first sub-frame image with the second sub-frame image such that a motion artifact associated with an input object and present in at least one of the acquired sub-frame images is suppressed by the combination of the combined sub-frame images. A variety of operations can be used to combine the first sub-frame image with the second sub-frame images. For example, a linear combination of the first and second sub-frame images can take place. Operations which include: addition, subtraction, multiplication, masking, averaging, Boolean operations, and spatial filtering may also be utilized to combine the first and second sub-frame images. Reference is made to the previous description of block 450 of FIG. 4 and to Equations 1-6 for additional description of a non-limiting variety of techniques which may be used to combine the first and second sub-frame images. It should be appreciated that, in some embodiments, a first technique may be applied in certain areas of the combined sub-frames (e.g., peak areas of the sub-frame images above a certain threshold are combined through multiplication of respective pixel values) while a second and different technique may be applied in other areas to combine the remaining portions of the sub-frames (e.g., averaging, Boolean operation, or masking and setting to zero may be used in off-peak areas to combine pixels that are below a certain threshold value).

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A method of input object sensing, said method comprising:
    driving a plurality of transmitter electrodes in a first way to acquire a first sub-frame image with said plurality of transmitter electrodes and a plurality of receiver electrodes of a sensor electrode pattern during a first sub-frame of a transcapacitive sensing frame;
    driving said plurality of transmitter electrodes in a second way to acquire a second sub-frame image with said plurality of transmitter electrodes and said plurality of receiver electrodes during a second sub-frame of said transcapacitive sensing frame, wherein said first way and said second way differ; and
    determining a capacitive image by combining said first sub-frame image with said second sub-frame image such that a motion artifact associated with an input object and present in at least one of said acquired sub-frame images is suppressed by said combining.

2. The method as recited in claim 1, wherein said driving a plurality of transmitter electrodes in a first way to acquire a first sub-frame image comprises:
    driving said plurality of transmitter electrodes based on a coding technique to acquire said first sub-frame image, wherein at least two of said plurality of transmitter electrodes are driven simultaneously using said coding technique; and
    wherein said driving said plurality of transmitter electrodes in a second way to acquire a second sub-frame image comprises:
    driving said plurality of transmitter electrodes based on a progressive scanning scheme to acquire said second sub-frame image, wherein only one transmitter electrode of said transmitter electrodes is driven at a time using said progressive scanning scheme.

3. The method as recited in claim 1, wherein said driving a plurality of transmitter electrodes in a first way to acquire a first sub-frame image comprises:
driving said plurality of transmitter electrodes based on a coding technique to acquire said first sub-frame image, beginning said coding technique at a first transmitter electrode of said plurality of transmitter electrodes; and
wherein said driving said plurality of transmitter electrodes in a second way to acquire a second sub-frame image comprises:
driving said plurality of transmitter electrodes based on said coding technique to acquire said second sub-frame image, beginning said coding technique at a second transmitter electrode of said plurality of transmitter electrodes, wherein said first and second transmitter electrodes are different from one another and located at different locations within said sensor electrode pattern.

4. The method as recited in claim 1, wherein said driving a plurality of transmitter electrodes in a first way to acquire a first sub-frame image comprises:
driving said plurality of transmitter electrodes based on a coding technique to acquire said first sub-frame image; and
wherein said driving said plurality of transmitter electrodes in a second way to acquire a second sub-frame image comprises:
driving said plurality of transmitter electrodes based a second coding technique to acquire said second sub-frame image, wherein codes of said first coding technique and said second coding techniques are different.

5. The method as recited in claim 4, wherein said driving said plurality of transmitter electrodes based a second coding technique to acquire said second sub-frame image, comprises:
driving said plurality of transmitter electrodes based on said second coding technique to acquire said second sub-frame image, wherein said second coding technique is the complementary pair of said first coding technique.

6. The method as recited in claim 1, wherein said driving a plurality of transmitter electrodes in a first way to acquire a first sub-frame image with said plurality of transmitter electrodes and a plurality of receiver electrodes of a sensor electrode pattern during a first sub-frame of a transcapacitive sensing frame comprises:
driving all of said plurality of transmitter electrodes simultaneously in said first way.

7. The method as recited in claim 1, wherein said determining a capacitive image by combining said first sub-frame image with said second sub-frame image such that a motion artifact associated with an input object and present in at least one of said acquired sub-frame images is suppressed by said combining comprises:
determining said capacitive image by combining said first sub-frame image with said second sub-frame image through one of addition, subtraction, multiplication, masking, averaging, Boolean operation, and spatial filtering.

8. A processing system comprising:
a sensor module configured to:
drive a plurality of transmitter electrodes in a first way to acquire a first sub-frame image with said plurality of transmitter electrodes and a plurality of receiver electrodes of a sensor electrode pattern during a first sub-frame of a transcapacitive sensing frame;
drive said plurality of transmitter electrodes in a second way to acquire a second sub-frame image with said plurality of transmitter electrodes and said plurality of receiver electrodes during a second sub-frame of said transcapacitive sensing frame, wherein said first way and said second way differ; and
a determination module configured to:
determine a capacitive image from said acquired sub-frame images of said transcapacitive sensing frame such that a motion artifact associated with an input object and present in at least one of said acquired sub-frame images is suppressed; and
determine a position of said input object within said capacitive image.

9. The processing system of claim 8, wherein said first way comprises a coding technique to drive a code on said plurality of transmitter electrodes to acquire said first sub-frame image, wherein at least two of said plurality of transmitter electrodes are driven simultaneously using said coding technique; and
wherein said second way comprises a progressive scanning scheme to acquire said second sub-frame image, wherein only one transmitter electrode of said transmitter electrodes is driven at a time using said progressive scanning scheme.

10. The processing system of claim 8, wherein said first way comprises a coding technique to drive a code on said plurality of transmitter electrodes to acquire said first sub-frame image, said code beginning at a first transmitter electrode of said plurality of transmitter electrodes; and
wherein said second way comprises beginning said code at a second transmitter electrode of said plurality of transmitter electrodes, wherein said first and second transmitter electrodes are different from one another and located at different locations within said sensor electrode pattern.

11. The processing system of claim 8, wherein said first way comprises a coding technique to drive a first code on said plurality of transmitter electrodes to acquire said first sub-frame image; and
wherein said second way comprises a second coding technique to drive a second code on said plurality of transmitter electrodes to acquire said second sub-frame image, wherein said first coding technique and said second coding technique are different and said first code and said second code are different.

12. The processing system of claim 11, wherein said second coding technique has low auto-correlation with said first coding technique.

13. The processing system of claim 8, wherein said first way comprises:
all of said plurality of transmitter electrodes being driven simultaneously.

14. A capacitive sensing input device, said capacitive sensing input device comprising:
a plurality of sensor electrodes disposed in a sensor electrode pattern; and
a processing system coupled with said plurality of sensor electrodes, said processing system configured to:
drive a plurality of transmitter electrodes of said sensor electrode pattern in a first way to acquire a first sub-frame image with said plurality of transmitter electrodes and a plurality of receiver electrodes of said sensor electrode pattern during a first sub-frame of a transcapacitive sensing frame;
drive said plurality of transmitter electrodes in a second way to acquire a second sub-frame image with said plurality of transmitter electrodes and said plurality of receiver electrodes during a second sub-frame of said transcapacitive sensing frame, wherein said first way and said second way differ; and determine a capacitive image through combination of said acquired sub-frame images of said transcapacitive sensing frame such that a motion artifact associated with an input object and present in at least one of said acquired sub-frame images is suppressed by said combining; and determine a position of said input object within said capacitive image.

15. The capacitive sensing input device of claim 14, wherein said first way comprises a coding technique to drive a code on said plurality of transmitter electrodes to acquire said first sub-frame image, wherein at least two of said plurality of transmitter electrodes are driven simultaneously using said coding technique; and wherein said second way comprises a progressive scanning scheme to acquire said second sub-frame image, wherein only one transmitter electrode of said transmitter electrodes is driven at a time using said progressive scanning scheme.

16. The capacitive sensing input device of claim 14, wherein said first way comprises a coding technique to drive a code on said plurality of transmitter electrodes to acquire said first sub-frame image, said code beginning at a first transmitter electrode of said plurality of transmitter electrodes; and wherein said second way comprises beginning said code at a second transmitter electrode of said plurality of transmitter electrodes, wherein said first and second transmitter electrodes are different from one another and located at different locations within said sensor electrode pattern.

17. The capacitive sensing input device of claim 14, wherein said first way comprises a coding technique to drive a first code on said plurality of transmitter electrodes to acquire said first sub-frame image; and wherein said second way comprises a second coding technique to drive a second code on said plurality of transmitter electrodes to acquire said second sub-frame image, wherein said first coding technique and said second coding technique are different and said first code and said second code are different.

18. The processing system of claim 17, wherein said second coding technique is the complementary pair of said first coding technique.

19. The capacitive sensing input device of claim 14, wherein said first way comprises:

all of said plurality of transmitter electrodes being driven simultaneously.

20. The capacitive sensing input device of claim 14, wherein said combining said first sub-frame image with said second sub-frame image consists of combining portions of said first and second sub-frames through at least one of addition, subtraction, multiplication, masking, averaging, Boolean operation, and spatial filtering.

* * * * *